US012577808B2

(12) United States Patent
Macernis

(10) Patent No.: US 12,577,808 B2
(45) Date of Patent: Mar. 17, 2026

(54) GATE LATCH

(71) Applicant: PrimeSource Building Products, Inc., Irving, TX (US)

(72) Inventor: Audrius Macernis, Victoria (AU)

(73) Assignee: PrimeSource Building Products, Inc., Irving, TX (US)

( * ) Notice: Subject to any disclaimer, the term of this patent is extended or adjusted under 35 U.S.C. 154(b) by 178 days.

(21) Appl. No.: 18/378,652

(22) Filed: Oct. 11, 2023

(65) Prior Publication Data

US 2025/0122748 A1 Apr. 17, 2025

(51) Int. Cl.
*E05B 15/04* (2006.01)
*E05C 19/16* (2006.01)

(52) U.S. Cl.
CPC ............ *E05B 15/04* (2013.01); *E05C 19/163* (2013.01); *E05B 2015/0465* (2013.01)

(58) Field of Classification Search
CPC ... E05C 1/10; E05C 1/006; E05C 1/08; E06B 9/04; Y10S 292/29; Y10S 292/37; Y10S 292/63; E05B 65/007; E05B 2015/0472; E05B 47/0038; E05B 47/0004; E05B 47/0046; Y10T 292/096; Y10T 292/0969; Y10T 292/0977; Y10T 292/11; Y10T 292/1014; H01F 7/04
USPC ................................................ 49/55, 57, 465
See application file for complete search history.

(56) References Cited

U.S. PATENT DOCUMENTS

2011/0132047 A1* 6/2011 Terhaar .................... E05B 17/04 70/91
2015/0015002 A1* 1/2015 Macernis .............. E05C 19/163 292/251.5
2015/0337575 A1* 11/2015 Macernis ................ E05C 19/16 292/138
2018/0094465 A1* 4/2018 Schneider ............. E05B 1/0092

FOREIGN PATENT DOCUMENTS

AU 2016201778 A1 * 10/2017

* cited by examiner

*Primary Examiner* — Christine M Mills
*Assistant Examiner* — Yahya Sidky
(74) *Attorney, Agent, or Firm* — Husch Blackwell LLP

(57) ABSTRACT

Disclosed herein is an improved gate latch for holding a gate locked with a fence. A striker component is adapted inside an elongated housing. The striker component has a first rod and a second rod, each passing through a spiral coil. A ring-shaped structure is also provided at one end of the second rod. Further, an engagement assembly is provided that has a lock cylinder and a retainer. The lock cylinder is operated using a key to move the retainer in and out of the ring-shaped structure. The retainer is received by the ring-shaped structure when the gate latch is in a locked position. A spring mechanism provided with the lock cylinder that allows the key to always come back to its lock position without getting stuck in any other position.

20 Claims, 5 Drawing Sheets

GATE LATCH

FIELD OF THE DISCLOSURE

The present invention relates to latch systems for gates, and more particularly to a gate latch used for providing increased safety in a required area.

BACKGROUND OF THE DISCLOSURE

A conventional swimming pool gate latch basically comprises a latch assembly preferably fitted to a hinged gate and a magnet assembly fitted to a fence post or in some cases another hinged gate. The magnet assembly usually is elongate in construction and is vertically fitted to the fence post. The magnet assembly comprises a release knob disposed atop thereof wherein, the release knob simply needs to be lifted in order to release or unlatch the gate.

Some gate latches include a self-latching mechanism along with a manual release mechanism to lock and unlock the latch respectively. The self-latching mechanism automatically closes the gate and prevents the gate from being opened from the other side, unless the manual release mechanism is used to unlock the latch and open the gate.

Self-latching gates are commonly used in situations where increased safety is required. For example, it is mandatory in some countries to provide self-closing gates for swimming pool fences, to prevent unsupervised access by small children in the event that other persons have forgotten to close the gate. Similarly, self-closing gates are often employed in households to prevent toddlers from accessing stairways and other potentially hazardous areas. Gates of this type generally include a helical spring-loaded hinge which produces a torque to bias the hinge towards the closed (or open, as the case may be) position. A problem which arises in relation to such gates is that they vary in dimension and weight, and so the spring tension in the hinge must be adjusted accordingly in order to have the gate close or open safely. Another problem associated with such latches are that the components of the latching mechanism, such as a striker may get stuck and can cause dangerous situations for the children. As such, the gate may not be safe for children to access pool area unsupervised.

The present subject matter as disclosed herein, aims to provide a safety gate latch that can be installed on swimming pool gates and the operating means thereof are safe yet smooth in operation.

SUMMARY

The present invention provides an improved gate latch for holding a gate locked with a fence, the gate latch comprising: an elongated housing having at least one flat surface with a pair of grooves; a striker component adapted inside the elongated housing, the striker component having a first rod and a second rod passing through a spiral coil; a ring-shaped structure provided at one end of the second rod; an engagement assembly disposed on the fence, the engagement assembly having a lock cylinder and a retainer that is received by the ring-shaped structure when the gate latch is in a locked position; the lock cylinder is operated using a key to move the retainer in and out of the ring-shaped structure; and a spring mechanism provided with the lock cylinder that allows the key to always come back to its lock position without getting stuck in any other position.

According to an embodiment of the present subject matter, spring mechanism comprises a disc spring and a washer.

According to an embodiment of the present subject matter, the lock cylinder is provided with a keyhole for inserting and subsequently rotating the key for locking and unlocking the gate latch.

According to an embodiment of the present subject matter, the lock cylinder is provided with a keyhole for inserting and subsequently rotating the key for locking and unlocking of the gate latch. The start position of the key is at zero degree with respect to a vertical axis of the keyhole.

According to an embodiment of the present subject matter, the key is turned to ninety degrees (90°) with respect to the start position to lock the retainer with the ring-shaped structure. Further, upon turning the key from 0 degree to 90 degrees manually by a human hand, a torque is generated by the disc spring on the key thereby bringing the key automatically to the start position as soon as the hand is taken off from the key.

According to an embodiment of the present subject matter, the key can be taken out of the keyhole at any of the zero degree position and the ninety degrees without sticking at any other position.

According to an embodiment of the present subject matter, a pair of mounting elements are provided that can be disposed on the gate. Each of the mounting elements is provided with ridges that facilitate to slidably align the pair of grooves and thereby mount the elongated housing on the gate.

According to an embodiment of the present subject matter, the elongated housing and the engagement assembly are arranged substantially perpendicularly to each other.

According to an embodiment of the present subject matter, the elongate housing is aligned upright with second rod adapted vertically below the first rod.

According to an embodiment of the present subject matter, the striking component comprises the magnet and the engagement assembly comprises a portion that is attractable to said magnet.

According to an embodiment of the present subject matter, the spiral coil is used for urging retraction of the first rod and the second rod.

According to an embodiment of the present subject matter, the elongated housing comprises a removably fitted top cap.

Other objects and advantages of the embodiments herein will become readily apparent from the following detailed description taken in conjunction with the accompanying drawings.

BRIEF DESCRIPTION OF THE DRAWING

Like reference numerals refer to like parts throughout the description of several views of the drawings.

Figure 1:
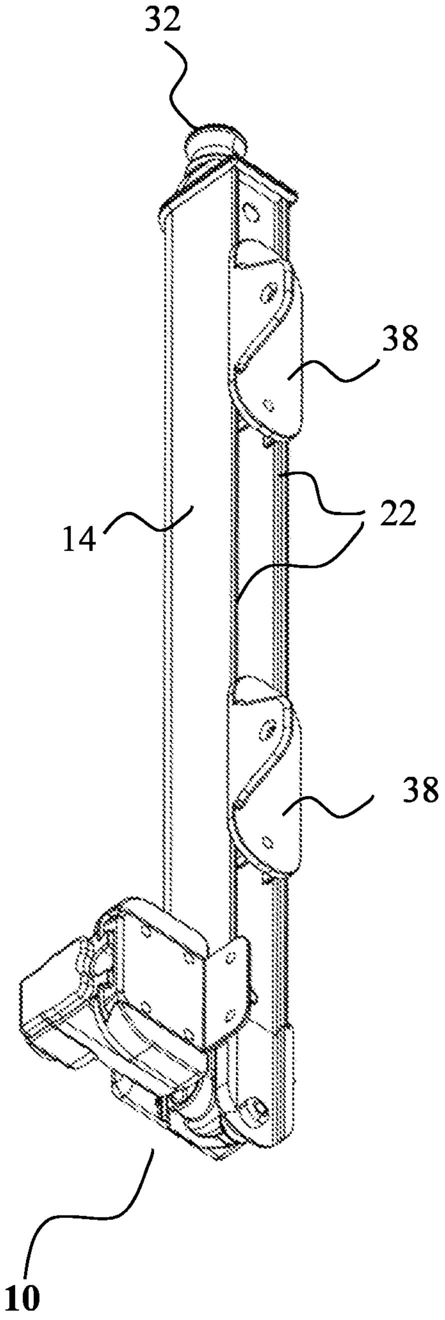
FIG. 1, according to an embodiment of the present invention, is an isometric view of the gate latch.

| FIGURES REFERENCE NUMERALS | |
|---|---|
| 10 | gate latch |
| 12 | disc spring |
| 14 | elongated housing |
| 16 | engagement assembly |
| 18 | first rod |
| 20 | keyhole |
| 21 | lock cylinder |
| 22 | pair of grooves |
| 24 | ring shaped structure |
| 26 | second rod |
| 28 | spiral coil |
| 30 | striker component |
| 32 | top cap |
| 34 | washer |
| 36 | retainer |
| 38 | mounting elements |

DETAILED DESCRIPTION OF THE INVENTION

This section is intended to provide explanation and description of various possible embodiments of the present invention. The embodiments used herein, and various features and advantageous details thereof are explained more fully with reference to non-limiting embodiments illustrated in the accompanying drawings and detailed in the following description. The examples used herein are intended only to facilitate an understanding of ways in which the embodiments herein may be practiced and to further enable the person skilled in the art to practice the embodiments used herein. Also, the examples/embodiments described herein should not be construed as limiting the scope of the embodiments herein. Corresponding reference numerals indicate corresponding parts throughout the drawings.

The present invention is an improved self-latching gate latch device that comprises a gate latch housing having striker components and a magnet component. The striker components comprise vertical rods that are vertically slidably received within an elongated housing. The elongated housing can be fitted to a fence post. A top portion of the striker component extends beyond the top of the housing, while the bottom extremity is secured to the magnet. The elongated housing further comprises a latch hole disposed at the bottom portion thereof wherein, when the striker component is at rest at a downward position within the housing, the magnet is aligned with the latch hole.

Figure 2:
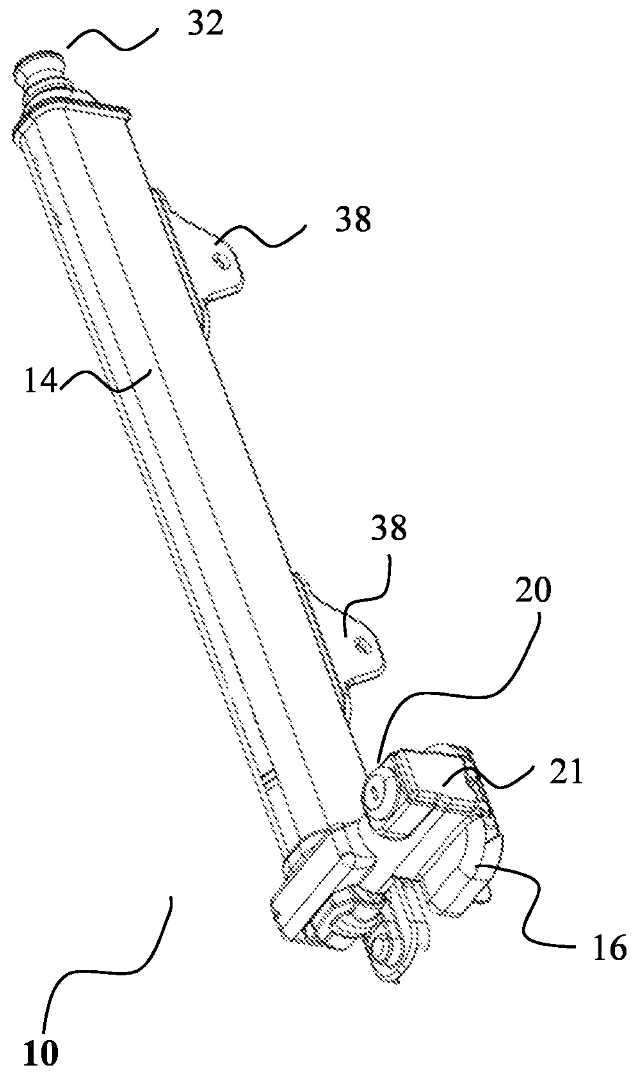
FIG. 2, according to an embodiment of the present invention, is another isometric view of the gate latch.
Figure 3:
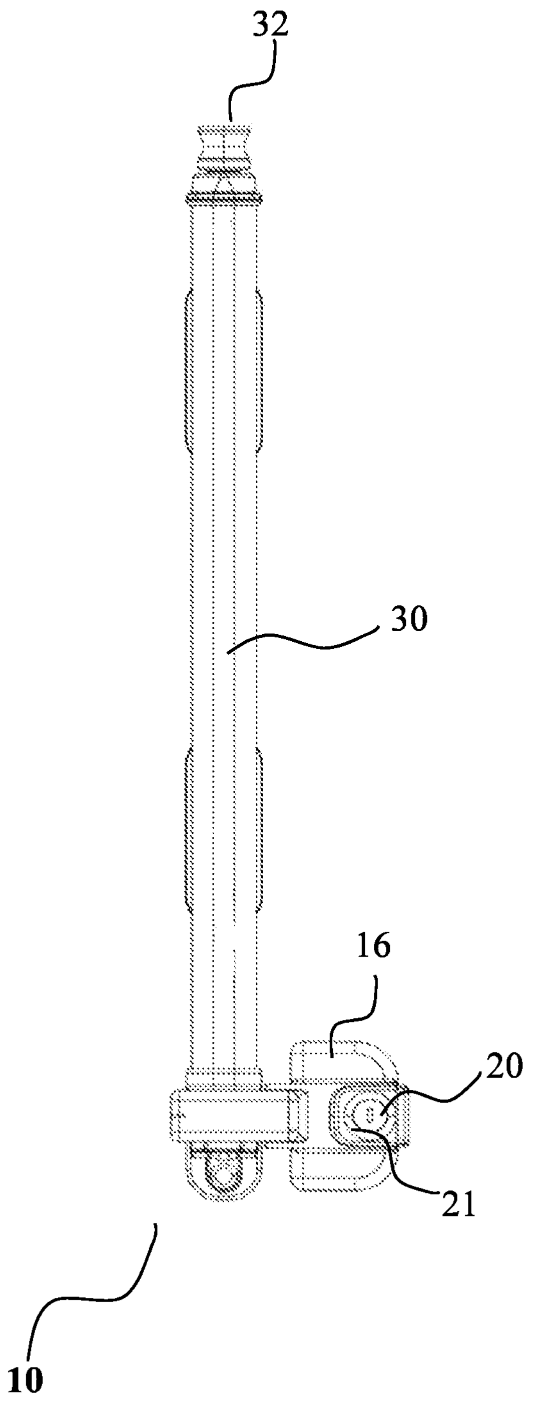
FIG. 3, according to an embodiment of the present invention, is a side view of the of the gate latch showing a keyhole provided.

FIG. 1 and FIG. 2 according to an embodiment of the present invention, shows different isometric views of the gate latch. FIG. 2, according to an embodiment of the present invention, is another isometric view of the gate latch. FIG. 3, according to an embodiment of the present invention, is a side view of the of the gate latch showing a keyhole provided.

Figure 4:
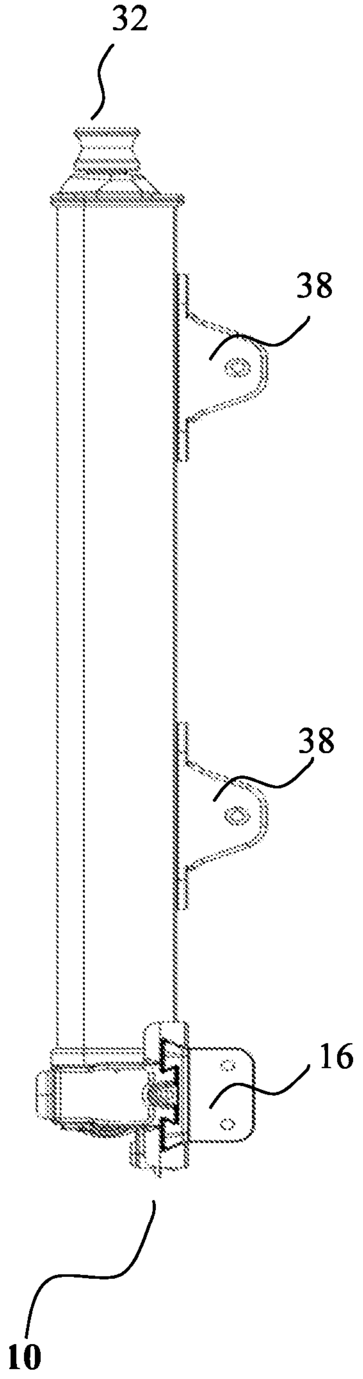
FIG. 4, according to an embodiment of the present invention, is another side view of the of the gate latch.

FIG. 4, according to an embodiment of the present invention, is another side view of the of the gate latch.

Figure 5:
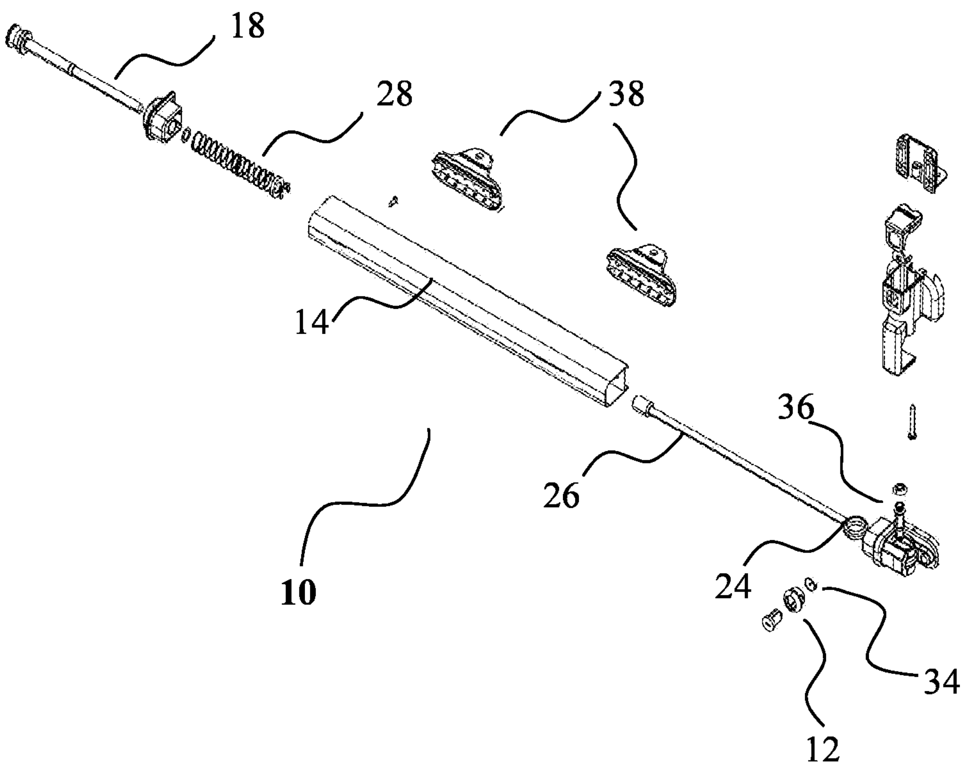
FIG. 5, according to an embodiment of the present invention, is an exploded view of the gate latch.

FIG. 5, according to an embodiment of the present invention, is an exploded view of the gate latch.

Referring to FIGS. 1-5, the gate latch assembly 10 comprises an elongated housing 14 having at least one flat surface with a pair of grooves 22. A striker component 30 is adapted inside the elongated housing 14. The striker component 30 has a first rod 18 and a second rod 26 passing through a spiral coil 28. A ring-shaped structure 24 provided at one end of the second rod 26 and an engagement assembly 16 disposed on the fence. The engagement assembly 16 includes a lock cylinder 21 and a retainer 36 that is received by the ring-shaped structure 24 when the gate latch 10 is in a locked position. The lock cylinder 21 is operated using a key to move the retainer 36 in and out of the ring-shaped structure 24 and a spring mechanism provided with the lock cylinder 21 that allows the key to always come back to its lock position without getting stuck in any other position. The lock cylinder 21 is provided with a keyhole 20 for inserting and subsequently rotating the key for unlocking the gate latch 10. The elongated housing 14 comprises a removably fitted top cap 32 as shown in the figures. The grooves 22

According to an embodiment of the present subject matter, the spring mechanism comprises a disc spring 12 and a washer 34. The disc spring 12 and the washer 34 are arranged in such a position that it facilitates the key to automatically come back to its start position. This helps the key to quickly unlock the latch 10 and is free to be taken out of the keyhole 20. Therefore, the chances of key being stuck in any other position (other than its starting position) is reduced. This improves the security and safety of the gate latch 10.

Further, a pair of mounting elements 38 are provided that can be disposed on the gate. Each of the mounting elements 38 is provided with ridges that facilitate to slidably align the pair of grooves 22 and thereby mount the elongated housing 14 on the gate. The grooves 22 are basically a plurality of tracks to guide the ridges of the mounting elements 38 to traverse therethrough. The housing 14 and the striker components 30 are elevated upward. As the magnet position is moved upwards, the increase in the distance between the magnet and the latch bar causes the attraction force therebetween to weaken resulting the latch bar being retracted to its default position thereby, ultimately resulting in the hinged door being unlatched from the fence post.

The elongated housing 14 and the engagement assembly 16 are arranged substantially perpendicularly to each other. The components of the housing 14 and the engagement assembly 16 communicate with each other for opening and locking purposes.

Also, the elongate housing 14 is aligned upright with second rod 26 adapted vertically below the first rod 18. The striker component 30 comprises the magnet and the engagement assembly 16 comprises a portion that is attractable to said magnet. The spiral coil 28 is used for urging retraction of the first rod 18 and the second rod 26.

The engagement assembly 16 comprises the retainer 36 attractable by the magnet and helps in holding the gate in locked with a fence post or a gate post. The gate is preferably a hinged gate. The striker component 30 is movable between a default disengagement position and an engagement position, where a substantial portion of the striker first rod 18 extends out of the latch housing 14. When the hinged gate is closed, the striker component 30, due to attraction force of the magnet (in the downward position), arrives at the engagement position at which point, the ring structure 24 adheres to the retainer 36 thereby latching the gate and the fence post.

According to an embodiment of the present subject matter, the lock cylinder 21 is provided with the keyhole 20 for inserting and subsequently rotating the key for locking and unlocking of the gate latch 10. The start position of the key is at zero degree ($0^{\circ}$) with respect to a vertical axis of the lock cylinder 21. The key is turned to ninety degrees (90°) with respect to the start position to lock the retainer 36 with the ring-shaped structure 24. Further, upon turning the key from 0 degree to 90 degrees manually by a human hand, a torque is generated by the disc spring 12 on the key thereby bringing the key automatically to the start position as soon as the hand is taken off from the key. Also, the key can be taken out of the keyhole 20 at any of the zero-degree position and the ninety degrees without sticking at any other position.

Thus, in the improved gate latch, when key is inserted into the lock cylinder 21, it is said to be at 0 degree, with reference to an applicable plane or axis of the lock cylinder 21. When the retainer (striker pin) 36 is in the locked state, the key position is at 90 degree. When a user turns the key manually from 0 degree to 90 degree, the torque works on the key, and subsequently, a spring force is applied on the key. If the user takes off his/her hand from the key, the key will automatically return to 0 degree as long as the key remains inserted into the lock cylinder 21 and is not pulled out by the user. In other words, the key can be positioned either at 0 degree position or at the 90 degrees position while operating the latch 10. There is no other position for the key to rest. Hence, the key will not stuck at any other position as the lock cylinder 21 tail does not conflict and does not stuck with the retainer or the striker pin 36 any more.

The gate latch 10 as disclosed herein overcomes the limitation of conventional latches that are complicated in design, are bulky as well as complicated in their installation, and difficult to operate using a key when the key is stuck inside at an unwanted position. Conventional locks and lock cylinders are configured to be positioned at any position when a key is inserted and turned. When the key gets stuck at an unwanted position, it can create a dangerous situation of some components being stuck and causing the gate not being safe for swimming pool or any other area. The present gate latch 10, however, eliminates the situation of key being stuck at any other position except the start position. When a user is using the key to operate the striker component 30, the spring mechanism of the lock cylinder allows the key to always come back to the start position, without being stuck in any other position. This makes the latch 10 safer.

The term exemplary is used herein to mean serving as an example. Any embodiment or implementation described as exemplary is not necessarily to be construed as preferred or advantageous over other embodiments or implementations. Further, the use of terms such as including, comprising, having, containing and variations thereof, is meant to encompass the items/components/process listed thereafter and equivalents thereof as well as additional items/components/process.

Although the subject matter is described in language specific to structural features and/or acts, it is to be understood that the subject matter defined in the claims is not necessarily limited to the specific features or process as described above. In fact, the specific features and acts described above are disclosed as mere examples of implementing the claims and other equivalent features and processes which are intended to be within the scope of the claims.

What is claimed is:

1. An improved gate latch for holding a gate locked with a fence, the gate latch comprising:

an elongated housing having at least one flat surface with a pair of grooves;

a striker component adapted inside the elongated housing, the striker component having a first rod and a second rod passing through a spiral coil;

a ring-shaped structure provided at one end of the second rod;

an engagement assembly disposed on the fence, the engagement assembly having a lock cylinder and a retainer that is received by the ring-shaped structure when the gate latch is in a locked position;

the lock cylinder is operated using a key to move the retainer in and out of the ring-shaped structure, the key is inserted into the lock cylinder to attain a start position; and a spring mechanism provided with the lock cylinder that allows the key to always come back to the start position without getting stuck in any other position, wherein the spring mechanism comprises a disc spring and a washer.

2. The improved gate latch according to claim 1, wherein the lock cylinder is provided with a keyhole for inserting and subsequently rotating the key for locking and unlocking of the gate latch.

3. The improved gate latch according to claim 2, wherein the start position of the key is at zero degrees (0°) with respect to a vertical axis of the keyhole.

4. The improved gate latch according to claim 2, wherein the key is turned to ninety degrees (90°) with respect to the start position to lock the retainer with the ring-shaped structure.

5. The improved gate latch according to claim 1, wherein upon turning the key from 0 degrees to 90 degrees manually by a human hand, a torque is generated by the disc spring on the key thereby bringing the key automatically to the start position as soon as the human hand is taken off from the key.

6. The improved gate latch according to claim 1, wherein the lock cylinder is configured such that the key is removable from the keyhole at any of a zero degree position and a ninety degree position without sticking at any other position.

7. The improved gate latch according to claim 1, further comprising a pair of mounting elements configured to be disposed on the gate.

8. The improved gate latch according to claim 7, wherein each of the mounting elements is provided with ridges that facilitate to slidably align the pair of grooves and thereby mount the elongated housing on the gate.

9. The improved gate latch according to claim 1, wherein the elongated housing and the engagement assembly are arranged substantially perpendicularly to each other.

10. The improved gate latch according to claim 1, wherein the elongate housing is aligned upright with second rod adapted vertically below the first rod.

11. The improved gate latch according to claim 1, wherein the striking component comprises a magnet and the engagement assembly comprises a portion that is attractable to said magnet.

12. The improved gate latch according to claim 1, wherein the spiral coil is used for urging retraction of the first rod and the second rod.

13. The improved gate latch according to claim 1, wherein the elongated housing comprises a removably fitted top cap.

14. The improved gate latch according to claim 1, wherein each of the first rod and the second rod are configured to pass through the spiral coil.

15. The improved gate latch according to claim 1, wherein the gate latch is in an engagement position when the retainer is moved into the ring-shaped structure, and wherein in the engagement position, a portion of the first rod extends out of the elongated housing.

16. A gate latch for holding a gate locked with a fence, the gate latch comprising:

an elongated housing having at least one flat surface with a pair of grooves;

a striker component adapted inside the elongated housing, the striker component having a first rod and a second rod passing through a spiral coil, wherein the striker component comprises a magnet;

a ring-shaped structure provided at one end of the second rod;

an engagement assembly disposed on the fence, the engagement assembly having a lock cylinder and a retainer that is received by the ring-shaped structure when the gate latch is in a locked position, wherein the engagement assembly comprises a portion that is attractable to the magnet of the striker component;

the lock cylinder is operated using a key to move the retainer in and out of the ring-shaped structure, the key is inserted into the lock cylinder to attain a start position; and a spring mechanism provided with the lock cylinder that allows the key to always come back to the start position without getting stuck in any other position.

17. The gate latch of claim 16, wherein upon turning the key from the start position to 90 degrees manually by a human hand, a torque is generated by the spring mechanism on the key thereby bringing the key automatically to the start position as soon as the human hand is taken off from the key.

18. The gate latch of claim 16, wherein the lock cylinder is provided with a keyhole for inserting and subsequently rotating the key for locking and unlocking of the gate latch.

19. A gate latch for holding a gate locked with a fence, the gate latch comprising:

an elongated housing having at least one flat surface with a pair of grooves;

a striker component adapted inside the elongated housing, the striker component having a first rod and a second rod passing through a spiral coil;

a ring-shaped structure provided at one end of the second rod;

an engagement assembly disposed on the fence, the engagement assembly having a lock cylinder and a retainer that is received by the ring-shaped structure when the gate latch is in a locked position;

the lock cylinder is operated using a key to move the retainer in and out of the ring-shaped structure, the key is inserted into the lock cylinder to attain a start position, wherein the lock cylinder is configured such that the key is removable from the keyhole at any of the start position and an end position which is ninety degrees offset from the start position without sticking at any other position; and a spring mechanism provided with the lock cylinder that allows the key to always come back to the start position without getting stuck in any other position.

20. The gate latch of claim 19, wherein the lock cylinder is provided with a keyhole for inserting and subsequently rotating the key for locking and unlocking of the gate latch.

* * * * *